(12) United States Patent
Suzuki

(10) Patent No.: US 8,089,552 B2
(45) Date of Patent: Jan. 3, 2012

(54) CAMERA CONTROL BASED ON TEMPERATURE SENSOR

(75) Inventor: Shinichi Suzuki, Yokohanma (JP)

(73) Assignee: Nikon Corporation, Tokyo (JP)

( * ) Notice: Subject to any disclaimer, the term of this patent is extended or adjusted under 35 U.S.C. 154(b) by 601 days.

(21) Appl. No.: 11/730,708

(22) Filed: Apr. 3, 2007

(65) Prior Publication Data

US 2007/0285542 A1 Dec. 13, 2007

(30) Foreign Application Priority Data

Apr. 5, 2006 (JP) ................................ 2006-104400
Apr. 3, 2007 (JP) ................................ 2007-097657

(51) Int. Cl.
*H04N 5/225* (2006.01)
*G08B 13/00* (2006.01)

(52) U.S. Cl. .............. 348/333.13; 348/372; 348/333.01

(58) Field of Classification Search ............ 348/208.16, 348/333.13, 372, 244; 345/101
See application file for complete search history.

(56) References Cited

U.S. PATENT DOCUMENTS

| | | | | |
|---|---|---|---|---|
| 6,522,361 | B2 * | 2/2003 | Higuchi et al. ............... | 348/372 |
| 6,798,456 | B1 | 9/2004 | Sato | |
| 7,064,787 | B2 * | 6/2006 | Kijima et al. ................. | 348/296 |
| 7,283,738 | B2 * | 10/2007 | Ohsuga ......................... | 396/303 |
| 2002/0018135 | A1 * | 2/2002 | Amano .................... | 348/333.01 |
| 2002/0080259 | A1 * | 6/2002 | Izumi ............................ | 348/348 |
| 2002/0080260 | A1 * | 6/2002 | Ojima .......................... | 348/348 |
| 2002/0135474 | A1 * | 9/2002 | Sylliassen .................... | 340/540 |
| 2003/0038886 | A1 * | 2/2003 | Fujii et al. ................. | 348/231.6 |
| 2003/0071913 | A1 * | 4/2003 | Yoshida ....................... | 348/372 |
| 2003/0080926 | A1 * | 5/2003 | Morimoto ...................... | 345/60 |
| 2005/0206769 | A1 * | 9/2005 | Kump et al. ............ | 348/333.01 |
| 2007/0222882 | A1 * | 9/2007 | Kobayashi .................... | 348/311 |
| 2008/0198258 | A1 * | 8/2008 | Ito ................................ | 348/349 |

FOREIGN PATENT DOCUMENTS

| | | |
|---|---|---|
| JP | A 2001-78084 | 3/2001 |
| JP | A-2002-90851 | 3/2002 |
| JP | A-2004-96328 | 3/2004 |
| JP | A-2004-248059 | 9/2004 |
| JP | A-2006-33705 | 2/2006 |

OTHER PUBLICATIONS

Jul. 19, 2011 Office Action in Japanese Patent Application No. 2007-097657 (with English translation).

* cited by examiner

*Primary Examiner* — David Ometz
*Assistant Examiner* — Dwight C Tejano
(74) *Attorney, Agent, or Firm* — Oliff & Berridge, PLC

(57) ABSTRACT

A temperature sensor is provided backward an imaging device. A temperature of the imaging device is always detected when a through image is displayed and result of measurement is output to an MPU. The MPU compares a temperature t input from the temperature sensor with a predetermined threshold value tc. When the temperature t of the imaging device becomes a value equal or higher than the predetermined threshold value tc, a warning display continues for a predetermined time, for example 15 seconds and then the through image on the backside liquid crystal display is stopped.

8 Claims, 5 Drawing Sheets

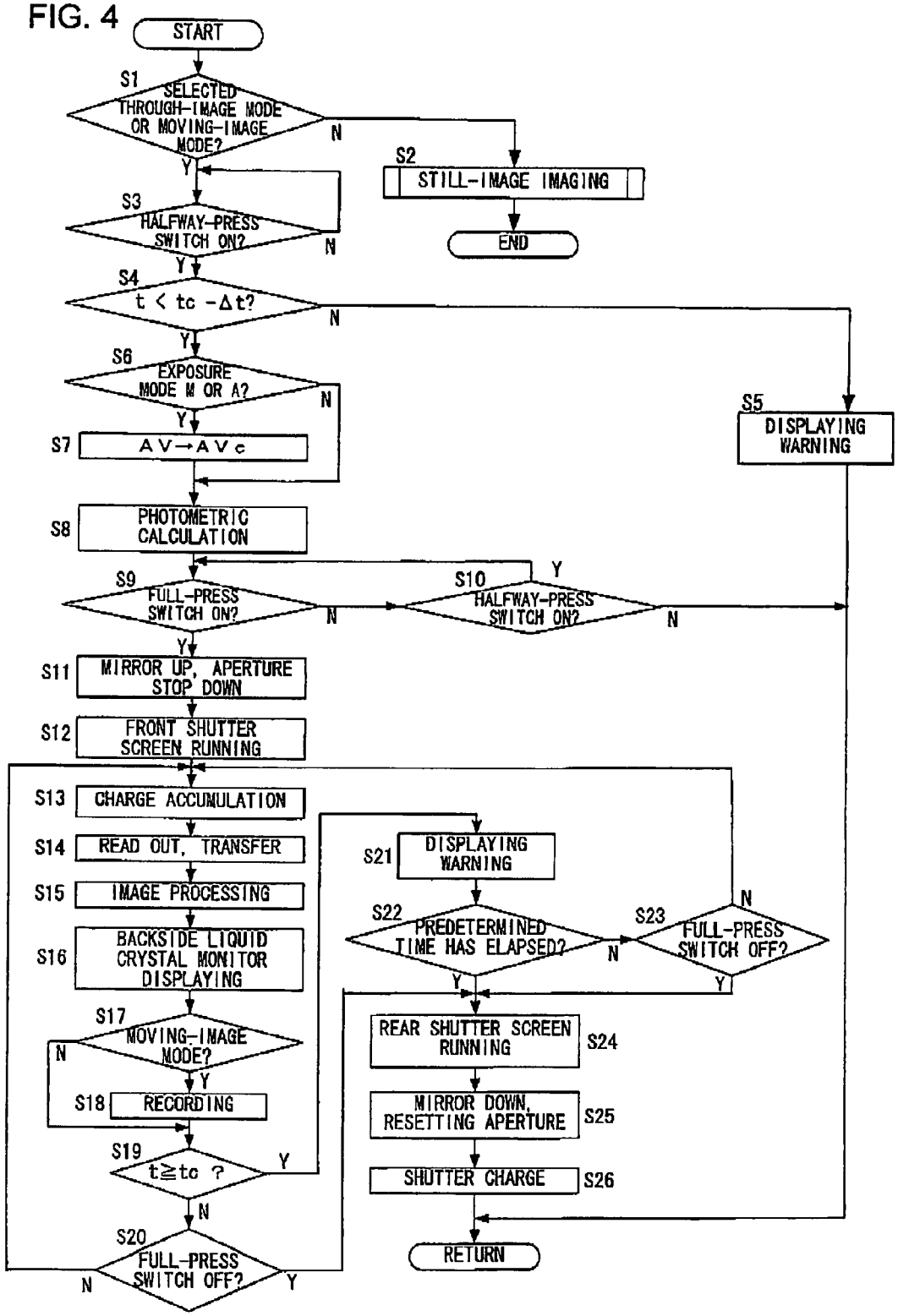

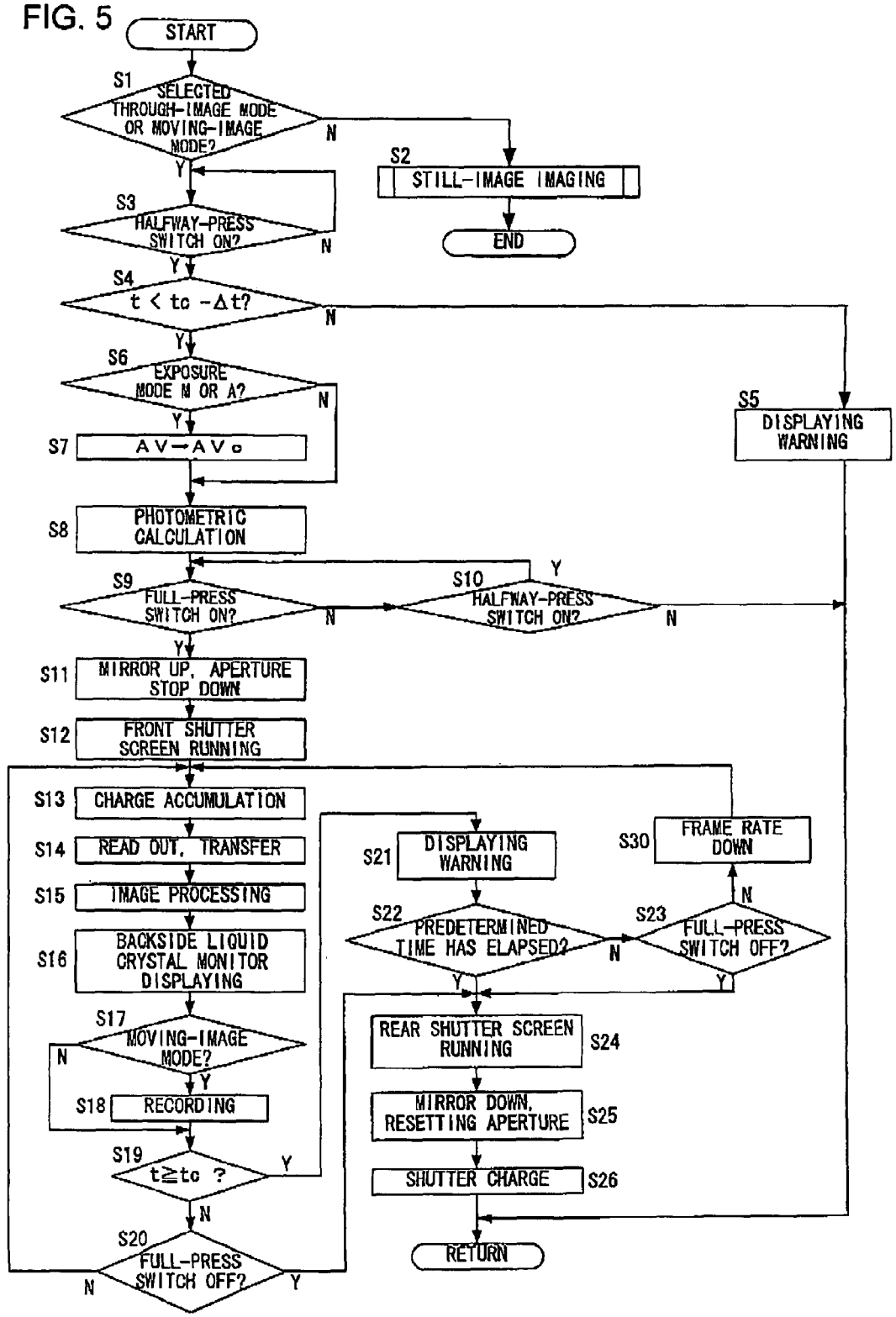

CAMERA CONTROL BASED ON TEMPERATURE SENSOR

DESCRIPTION OF RELATED APPLICATION

The disclosure of the following priority applications are incorporated herein by reference:

Japanese Patent Application No. 2006-104400 filed Apr. 5, 2006.

Japanese Patent Application No. 2007-097657 filed Apr. 3, 2007.

BACKGROUND OF THE INVENTION

1. Field of the Invention

The present invention relates to a camera including an imaging device that takes an image of a photographic subject.

2. Description of the Related Art

It is known that dark current generated by an increase in the temperature of an imaging device deteriorates the image quality of images taken. Japanese Patent Application Laid-open No. 2001-78084 discloses prevention of the deterioration of image quality by limiting exposure time during photography with long-time exposure.

However, much heat is also generated by repeated continuous imaging due to processing in the imaging device or its driving unit, image processing unit and so on. Further, Along with development of cameras that operates at a higher speed and an increased number of pixels in the imaging device, generation of heat increases due to processing in the imaging device and its driving unit, image processing unit and so on. In particular, when an imaging device with a larger number of pixels repeats continuous imaging for a long period of time, the imaging device and its peripheral circuits may be at high temperatures resulting in deterioration of image quality of the image taken. However, the imaging device can be operated by a user.

SUMMARY OF THE INVENTION

Therefore, it is an object of the present invention to provide a camera that obviates the above-mentioned defects of the conventional electronic camera.

The camera according to the present invention comprises a detecting unit that detects a physical quantity correlative with a temperature in the periphery of an imaging device when the imaging device captures an image; and an operation changing unit that changes an operation of the camera when the physical quantity detected by the detecting unit satisfies a predetermined condition so that an increase in the temperature of the imaging device or the temperature in the periphery of the imaging device is prevented.

The camera may further comprise a display unit that displays a realtime-image taken by the imaging device until the physical quantity satisfies the predetermined condition. The operation changing unit stops the displaying of the realtime-image by the display unit when the physical quantity satisfies the predetermined condition or after lapse of a predetermined period of time from a time when the physical quantity satisfies the predetermined condition.

When the camera with the display unit further includes a shutter that controls a quantity of incident light from a photographic subject into the imaging device, the operation changing unit can stop introduction of the incident light from the photographic subject into the imaging device by the shutter and stops the displaying of the realtime-image.

The changing of the operation of the camera by the operation changing unit may include switching off a screen of the display unit to stop the displaying of the realtime-image. The changing of the operation of the camera may be performed by decreasing a frame rate of imaging by the imaging device.

Preferably, the above-mentioned various types of cameras include a warning unit that notifies a warning that the operation of the camera is about to be changed when the physical quantity satisfies a predetermined condition.

In another aspect of the invention, a camera comprises an instructing unit that instructs initiation of imaging by the imaging device, a display unit that displays a realtime-image taken by the imaging device in response to the initiation of the imaging by the imaging device, a detecting unit that detects a physical quantity correlative with a temperature in the periphery of the imaging device, and a stopping unit that stops displaying of the realtime-image by the display unit when the initiation of imaging is instructed by the instructing unit and the physical quantity detected by the detecting unit satisfies a first predetermined condition.

When the camera further includes a shutter that controls a quantity of incident light from a photographic subject into the imaging device, the stopping unit can stop introduction of the incident light from the photographic subject into the imaging device by the shutter and stops the displaying of the realtime-image. Also, the stopping unit can stop switch off a screen of the display unit to stop the displaying of the realtime-image.

In the camera according to another aspect of the present invention, the instructing unit instructs displaying of the realtime-image by the display unit by full-press operation of a release button. In the camera with this instructing unit, the stopping unit can prohibit the displaying of the realtime-image by the display unit upon full-pressing of the release button when the release button is halfway-pressed and the physical quantity detected by the detecting unit satisfies a second predetermined condition. It is preferable that there is provided a warning unit that notifies a warning that displaying of the realtime-image is stopped. The warning unit can notify a warning that displaying of the realtime-image is stopped when the physical quantity satisfies the first predetermined condition.

In the camera according to another aspect of the present invention, the detecting unit is a temperature sensor that detects a temperature in the periphery of the imaging device, and the first predetermined condition is a condition under which the temperature is equal to or higher than a first threshold, and the second predetermined condition is a condition under which the temperature is equal to or higher than a second threshold, which is a temperature lower than the first threshold.

BRIEF DESCRIPTION OF THE DRAWINGS

FIG. 4 is a flowchart illustrating operation of the electronic camera according to one embodiment of the present invention; and FIG. 5 is a flowchart illustrating operation of the electronic camera according to one embodiment of the present invention when the frame rate of through-image is decreased after displaying warning.

DETAILED DESCRIPTION OF THE PREFERRED EMBODIMENTS

In the single-lens reflex camera according to one embodiment which will be described hereinbelow, an image of a photographic subject taken realtime can be displayed on a backside liquid crystal display in a still image shooting mode and a moving-image shooting mode. In the following description, a realtime-image in a still image shooting mode is called a "through-image" while a realtime-image in a moving image shooting mode is called a "moving-image". The through-image and moving-image are displayed when the user sets a through-image mode or a moving image mode and further full-presses a release button.

When the temperature near an imaging device 21 increases, a dark current component in the imaging device increases, which may result in overlapping of a noise component on the realtime-image on the backside liquid crystal display. In the camera according to this embodiment, when a realtime-image is displayed after the full-pressing of the release button and if the temperature near the imaging device 21 increases to a value equal to or higher than a first threshold, then the shutter is closed after a lapse of a predetermined time to stop the imaging of the photographic subject and stop displaying the realtime-image. On the other hand, when the release button is halfway-pressed and no realtime-image has been displayed yet on the backside liquid crystal display, if the temperature near the imaging device 21 increases to a value equal to or higher than a second threshold which is a lower temperature than the first threshold, then the displaying a realtime-image is prohibited even if the release button is full-pressed and a warning to this effect is displayed.

Hereinafter, embodiments of the electronic camera of the present invention will be described by referring to the attached drawings.

Figure 1:
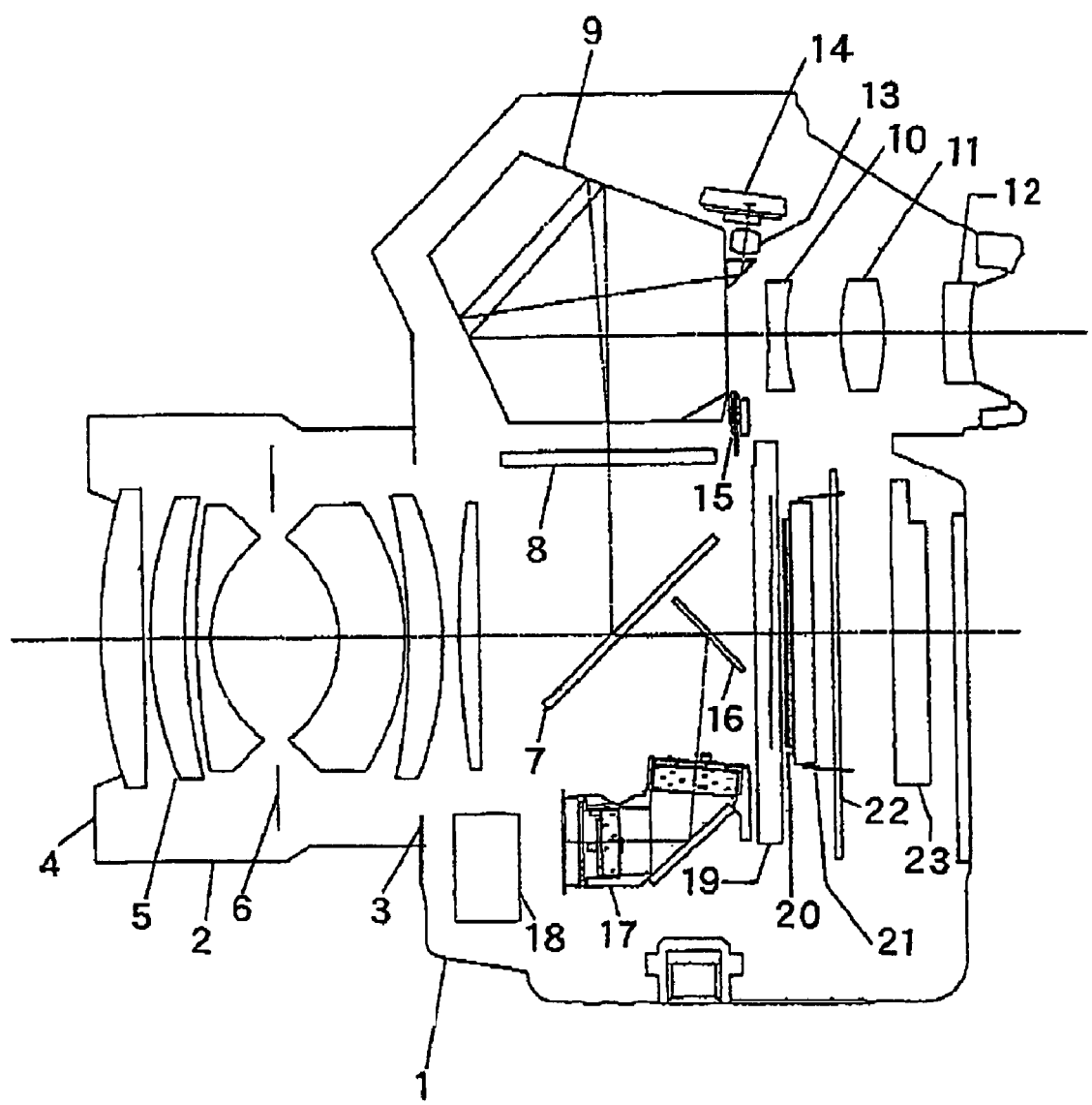
FIG. 1 is a longitudinal cross-sectional view showing a major construction of an electronic camera according to one embodiment of the present invention.
Figure 2:
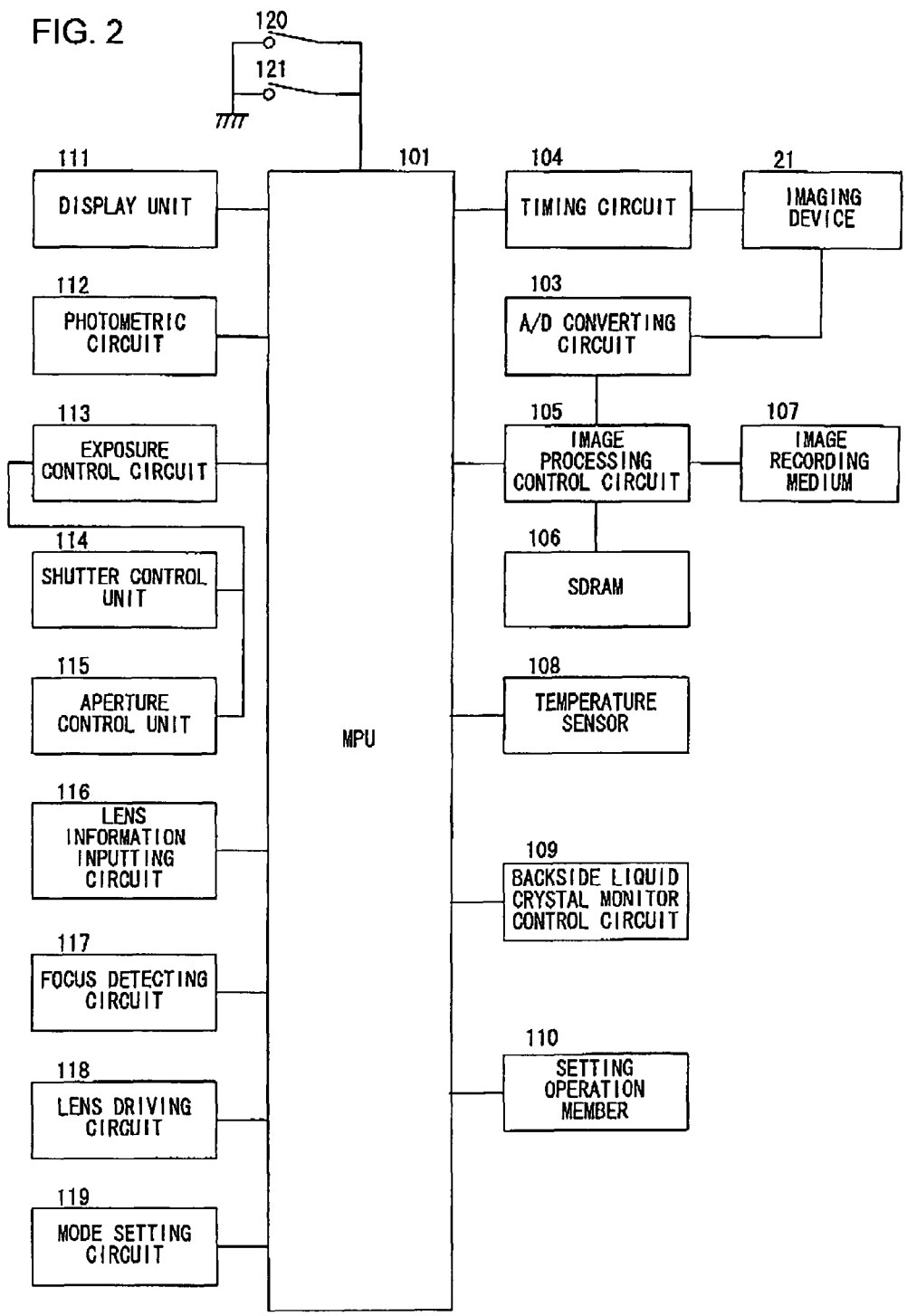
FIG. 2 is a block diagram of the electronic camera illustrating the system construction of the electronic camera according to one embodiment of the present invention.

An embodiment of the camera of the present invention will be explained referring to the accompanying drawings, in which FIG. 1 is a longitudinal cross-sectional view showing a major construction of an electronic camera and FIG. 2 is a block diagram of the electronic camera.

As shown in FIG. 1, an electronic camera 1 is detachably attached with a lens barrel 4 having an imaging lens through a mount 3. The lens barrel 4 is provided therein with, for example, an imaging lens 2 constituted by a group of lens 5 and an aperture 6. The group of lens 5 is driven by a lens driving device 18 that includes a motor, a coupling gear, and a coupling.

In the inside of the electronic camera 1, there is provided an imaging device 21 for taking an image of a photographic subject. Examples of the imaging device 21 that can be used includes a charge coupled device (CCD) and a complementary metal-oxide semiconductor (CMOS). A movable mirror 7 is provided between the imaging lens 2 and the imaging device 21. The movable mirror 7 reflects light from the photographic subject that passes through the imaging lens 2 to a viewfinder optical system. A portion of the light from the photographic subject passes through a translucent region of the movable mirror 7 and is downward reflected by a sub-mirror 16 to enter a focus-detecting sensor 17.

The camera includes a central processing unit and various components. As shown in FIG. 2, a micro-processing unit (MPU) 101 is connected through a timing circuit 104 to the imaging device 21. The imaging device 21 is connected to an analog/digital (A/D) converting circuit 103 to which an image processing control unit 105 is connected. The image processing control unit 105 is connected to the MPU 101, SDRAM 106 and an image recording medium 107. The MPU 101 is connected to a backside liquid crystal display control circuit 109, a setting operation member 110, a displaying device 111, and a photometric circuit 112. The MPU 101 is further connected to an exposure control circuit 113, which in turn is connected to a shutter control unit 114 and an aperture control unit 115. The MPU 101 is connected to a lens information inputting circuit 116, a focus detecting circuit 117 provides in the focus detecting sensor 17 in FIG. 2, a lens driving circuit 118, a mode setting circuit 119, a halfway-press switch 120, and a full-press switch 121.

The light from the photographic subject undergoes photoelectric conversion by the focus-detecting sensor 17 and the resultant signal is A/D converted by the focus detecting circuit 117 shown and then input into MPU 101 as shown in FIG. 2.

The light from the photographic subject reflected by the movable mirror 7 provides an image on a focusing screen 8 that is provided on an optically equivalent position relative to the imaging device 21. The image of the photographic subject provided on the focusing screen 8 is on one hand viewed by the photographer from a pentaprism 9 through ocular lenses 10, 11, and 12 and on the other hand provides an image on a light receiving surface of a photometric sensor 14 through a photometric lens 13. An in-finder displaying liquid crystal 15 is under control of a displaying device 111 shown in FIG. 2 and displays various pieces of information relating to exposure control quantity, exposure mode, exposure correction quantity concerning imaging in the lower part of the viewfinder screen.

Upon taking images, the movable mirror 7 moves from on a light path of the photographic subject to outside the light path and an image of the photographic subject is provided on the imaging device 21. Immediately before the imaging device 21 are provided a shutter 19 and a low-pass filter 20. On the backside of the imaging device 21, an imaging circuit board 22 is provided. On the imaging circuit board 22, there are provided the above-mentioned timing circuit 104 that drives the imaging device 21, the analog/digital (A/D) converting circuit 103, the image processing control circuit 105 constituted of ASIC and so on, the temperature sensor 108 that measures the temperature in the periphery of the imaging device 21, and so on. The temperature sensor 108 detects a value (physical quantity) that varies depending on the temperature in the periphery of the imaging device 21.

The MPU 10 shown in FIG. 2 is a microcomputer that controls the electronic camera 1 and includes a CPU, a ROM, a RAM and various peripheral circuits. The timing circuit 104 outputs a driving signal in response to an instruction sent from the MPU 101 to drive the imaging device 21 and the A/D conversion circuit 103 in respective predetermined timing. The imaging device 21 receives a driving signal, so that it accumulates signal charges corresponding to the image of the photographic subject formed on the imaging surface and sweeps out the accumulated charges. The A/D conversion circuit 103 converts analog imaging signals output from the imaging device 21.

In the image processing control circuit 105, the input digital image signals are subjected to image processing such as white balance adjustment, sharpness adjustment, gamma correction, gradation adjustment and so on and then output as image data. The image data is compressed in a JPEG format or the like, and then temporarily stored in a SDRAM 106 or recorded in the image recording medium 107 in a file format such as an EXIF. At the same time, the image data is displayed on the backside liquid crystal monitor 23 as shown in FIG. 1 by the backside liquid crystal monitor control circuit 109.

The photometric circuit 112 A/D-converts photometric signals received from the photometric sensor 14 as shown in FIG. to output the converted digital signals to the MPU 101. The digital-converted photometric signals are input in the exposure control circuit 113 and a shutter speed and an aperture value of the imaging lens 2 are calculated based on the luminance of the photographic subject and a film speed. The result of the calculation is output to the shutter control unit 114 and the aperture control unit 115 to control the shutter speed and aperture value.

The lens driving circuit 118 generates a lens driving signal that drives the lenses based on lens information including an aperture opening value, a focal length, an exit pupil, and so on input through the lens information inputting circuit 116 and on a focusing state obtained by a focus detecting circuit 117, and outputs the obtained lens driving signal to the lens driving device 18.

The halfway-press switch 120 outputs an ON signal to the MPU 101 in conjunction with a first stroke of a release button and a full-press switch 121 outputs an ON signal to the MPU 101 in conjunction with a second stroke of the release button.

The mode-setting circuit 119 sets various modes of the electronic camera 1. More particularly, the mode-setting circuit 119 sets, for example, imaging modes including a single-shot mode, a continuous-shot mode (these being still-image modes), a moving-image mode, and a through-image mode and exposure modes including a manual (M) mode, aperture-priority (A) mode, a program (P) mode, and a shutter-speed priority (S) mode. These setting operations are performed by use of the setting operation member 110. The setting operation member 110 is an operating switch that performs various setting operations and outputs operation signals in compliance with the content of the setting to the MPU 101. Note that the through-image mode is a mode in which an image is displayed on the backside liquid crystal monitor 23 but no recording of images taken is performed. It is a mode used, for example, when focusing a camera on an article to be photographed in a studio or the like.

When the through-image mode is set by the mode-setting circuit 119 and an ON signal is input to the MPU 101 by the full-press switch 121, the MPU 101 controls the system so that the movable mirror 7 is moved upwardly and the above-mentioned series of actions from the charge accumulation by the imaging device 21 to the displaying of an image on the backside liquid crystal monitor 23 can be repeated, for example, 15 times or more per second. That is, the through-image is displayed as a realtime-image on the backside liquid crystal monitor 23 at a frame rate of 15 frames per second (fps) or more.

The temperature sensor 108 always performs measurement of the temperature in the periphery of the imaging device 21 and outputs the result of measurement to the MPU 101. The MPU 101 compares a temperature t of the imaging device 21 input from the temperature sensor 108 with a first threshold tc, and a second threshold tc−Δt, that are set in advance.

The second threshold tc−Δt is a value slightly smaller than the first threshold tc and if the temperature t detected by the temperature sensor 108 becomes equal to or higher than the second threshold tc−Δt, a second control is performed.

The second control is a control different from the first control that is performed when the detected temperature tc is equal to or higher than the first threshold tc.

Figure 3:
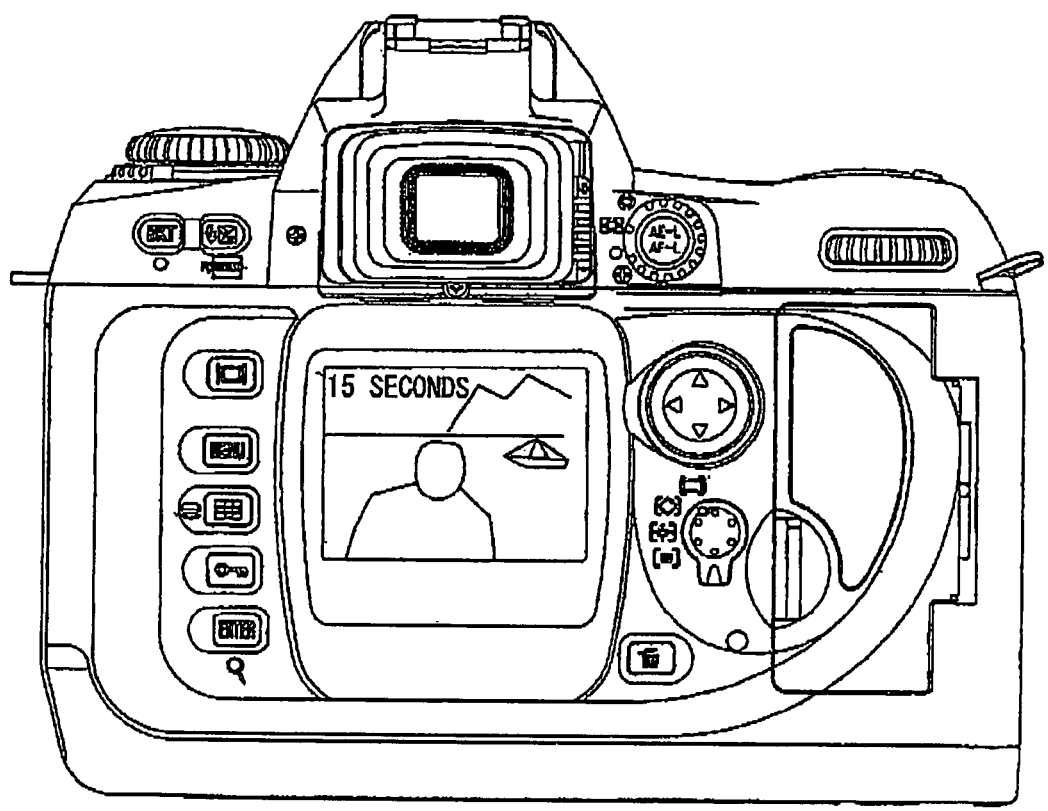
FIG. 3 is a schematic external view illustrating an example of warning displayed on the backside liquid crystal monitor of the electronic camera according to one embodiment of the present invention.

Under the first control, the camera operates as follows. If the temperature t of the periphery of the imaging device 21 increases to or above the first threshold tc due to heat generated by the imaging device 21 and imaging circuit board 22, the MPU 101 causes warning to be displayed on the backside liquid crystal monitor 23, and after a predetermined period of time, for example, after 15 seconds, the MPU 101 stops the displaying of the image on the backside liquid crystal monitor 23. FIG. 3 shows an example of warning to be displayed. In FIG. 3, "15 SECONDS" is displayed on the upper left portion of the backside liquid crystal monitor 23 as a time required stopping the displaying of the image.

The display of warning is not particularly limited to one that displays a time required to stop the displaying of image and may be one that displays a warning sentence that reads: for example, "DISPLAYING WILL BE STOPPED BECAUSE OF HIGH TEMPERATURE." and stops displaying the through-image.

The first threshold tc is a value determined based on the temperature in the periphery of the imaging device 21 and the state of noise appearing in the displayed image on the backside liquid crystal monitor 23 due to dark current generated by that temperature.

In the first control, the camera operates as follows. If the temperature, t, in the periphery of the imaging device 21 becomes equal to or higher than the second threshold tc−Δt, the displaying of the through-image and moving-image is prohibited even when full-press operation is performed. A warning display of "THROUGH-IMAGE OR MOVING-IMAGE IS NOT DISPLAYED IF THE BUTTON IS FULL-PRESSED" or the like is displayed.

The action of the electronic camera 1 according to the above-mentioned embodiment is explained referring to a flowchart in FIG. 4. The software program that causes a computer to perform respective processing operations shown in FIG. 4 is stored in a ROM (not shown) in the MPU 101 and is started when an ON signal is input to the MPU 101 from a power source of the camera.

In a step S1, judgment is made whether a through-image mode or a moving-image mode is selected. When the through-image mode or moving-image mode is selected, the step S1 is judged to be positive (Y) and the control proceeds to a step S3. When a single-shot mode or a continuous-shot mode is selected, the step S1 is judged to be negative (N) and the control proceeds to a step S2. In the step S2, accumulation of charges corresponding to the image of the photographic subject by the imaging device 21 and sweeping out of the accumulated charges, the above-mentioned image processing by the image processing control circuit 105, and image recording processing such as recording of the processed image data to the image recording medium 107 are performed in response to the full-press operation of the release button and a series of actions of the electronic camera 1 is completed.

In the step S3, judgment is made whether or not the release button is halfway-pressed. When an ON signal is input from a halfway-press switch 120, the step S3 is judged to be positive (Y) and the control proceeds to a step S4. When no ON signal is input from the halfway-press switch 120, the step S3 is judged to be negative (N) and the control stands by for an input of an ON signal from the halfway-press signal 120.

In the step S4, it is judged whether or not the temperature t of the imaging device 21 is below a value of threshold (tc−Δt). When the temperature t is below a value of the threshold tc−Δt, the step S4 is judged to be positive (Y) and the control proceeds to a step S6. On the other hand, when the temperature t is equal to or higher than the threshold tc−Δt, the step S4 is judged to be negative (N) and the control proceeds to a step S5. In the step S5, a warning sentence such as "THROUGH-IMAGE AND MOVING-IMAGE WILL NOT BE DISPLAYED IF THE BUTTON IS FULL-PRESSE." is displayed on the backside liquid crystal monitor 23 and all the subsequent processing operations are skipped to complete a series of actions. Therefore, the displaying of the through-image and moving-image by full-press operation is prohibited.

In a step S6, whether the exposure mode is an M mode (manual mode) or an A mode (aperture-priority mode) is judged. When the M mode or the A mode is selected, the step S6 is judged to be positive (Y) and the control proceeds to a step S7. When a P mode (program mode) or an S mode (shutter-speed-priority mode) is selected, the step S6 is judged to be negative (N) and the control skips the step S7 and proceeds to a step S8.

In the step S7, a set aperture value AV is substituted with a controlled aperture value AVc and the control proceeds to the step S8. The controlled aperture value AVc is manually set by a user or determined on the basis of A mode. In the step S8, photometry and exposure calculation are performed and film speed SV and shutter speed TV are determined based on the set aperture value AV. Then, the control proceeds to a step S9.

In the step S9, judgment is made whether or not the release button is full-pressed. When an ON signal is input from the full-press switch 121, the step S9 is judged to be positive (Y) and the control proceeds to a step S1. When no ON signal is input from the full-press switch 121, the step S9 is judged to be negative (N) and the control proceeds to a step S10.

In the step S10, judgment is made as to whether a halfway-press of the release button is performed in the same manner as that in the step S1. When an ON signal is input from the halfway-press switch 120, the step S10 is judged to be positive (Y) and the control returns to the step S9. When no ON signal is input from the halfway-press switch 120, the step S10 is judged to be negative (N) and the control skips all the processing and completes a series of actions.

In the step S11, the movable mirror 7 is driven to a mirror up position by a sequence circuit (not shown). Further, the aperture 6 is stopped down by the aperture control unit 115 to the controlled aperture value AVc and the control proceeds to a step S12. In the step S12, the holding of the front screen of the shutter 19 is released and the front screen runs to bring the shutter 19 in a full-open state.

Subsequently, the control proceeds to a step S13, where accumulation of charges is started by the imaging device 21, and then to a step S14. In the step S14, reading out and transfer of the charges accumulated by the imaging device 21 are performed and the control proceeds to a step S15. In the step S15, the above-mentioned image processing is performed by the image processing control circuit 105 based on an output signal from the imaging device 21 and the control proceeds to a step S16.

In the step S16, the image subjected to image processing in the step S15 is displayed on the backside liquid monitor 23 by the backside liquid crystal control circuit 109 and the control proceeds to a step S17. In the step S17, judgment is made whether or not a moving-image mode is selected. When the moving-image mode is selected, the step S17 is judged to be positive (Y) and the control proceeds to a step S18. When a through-image mode is selected, the step S17 is judged to be negative (N) and the control skips the step S18 and proceeds to a step S19. In the step S18, the image data is compressed and then recorded in the image recording medium 107 and the control proceeds to the step S19.

In the step S19, judgment is made whether or not the temperature t in the periphery of the imaging device 21 detected by the temperature sensor 108 is equal to or higher than a predetermined temperature tc. When the temperature t is equal to or higher than the predetermined temperature tc, i.e., $t \geq tc$, the step S19 is judged to be positive (Y) and a timer (not shown) is started, the control then proceeding to a step S21. When the temperature t is below the predetermined temperature tc, i.e., $t < tc$, the step S19 is judged to be negative (N) and the control proceeds to a step S20.

In the step S20, judgment is made whether or not the release button is full-pressed. When an ON signal is input from the full-press switch 121, the step S20 is judged to be negative (N) and the control returns to the step S13. On the other hand, when no ON signal is input from the full-press switch 121, the step S20 is judged to be positive (Y) and the control proceeds to a step S24 with skipping the below-mentioned steps S21 and S22. That is, the second full-press operation stops the through-image mode and the moving-image mode.

In the step S21, warning as shown in FIG. 3 is displayed on the backside liquid crystal monitor 23 and the control proceeds to the step S22. In the step S22, judgment is made whether or not the time metered by a timer started upon the positive judgment of the step S19 exceeds a predetermined time. When the metered time exceeds the predetermined time, the step S22 is judged to be positive (Y) and the control proceeds to a step S24 while when the metered time is within the predetermined time, the step S22 is judged to be negative (N) and the control proceeds to the step S23.

In the step S23, whether the release button is full-pressed or not, more particularly whether or not the full-press switch 121 is off is judged in the same manner as that in the step S20. When an ON signal is input from the full-press switch 121, the step S23 is judged to be negative (N) and the control returns to the step S13. On the other hand, when no ON signal is input from the full-press switch 121, the step S23 is judged to be positive (Y) and the control proceeds to a step S24.

In the step S24, the holding of the rear screen of the shutter 19 is released by the shutter control unit 114 and the rear screen runs to close the shutter 19, then the control proceeding to a step S25. In the step S25, the movable mirror 7 is moved down by a sequence circuit (not shown). Further, reset of the aperture 6 is started by the aperture control unit 115, and the control proceeds to a step S26. In the step S26, shutter charge is performed to complete a series of actions.

According to the above-mentioned embodiment, the following advantageous effects can be obtained.

(1) When a predetermined time elapsed after a condition is satisfied that the temperature t that is usually detected in the periphery of the imaging device 21 is equal to or higher than a threshold tc while a realtime-image such as a through-image or moving-image is being displayed on the backside liquid crystal monitor 23, the operation of the camera is changed so that an increase in temperature of the imaging device 21 and the peripheral circuits can be prevented. That is, the rear shutter screen is run to cut off an incident light from the photographic subject to stop the displaying of the realtime-image on the backside liquid crystal monitor 23. Specifically, introduction of the light from the photographic subject is stopped and substantially no accumulation of electric charge does occur in the imaging device 21 so that black screen images are displayed on the backside liquid crystal monitor 23. Therefore, the image device and peripheral circuits can be prevented from being exposed to undesirably high temperatures. In addition, screen images deteriorated due to generation of heat can be prevented from being displayed on the backside liquid crystal monitor 23.

(2) When a predetermined time elapsed after a warning on the backside liquid crystal monitor 23 starts to be displayed, the displaying of the realtime-image is stopped. Therefore, before displaying warning, no significant influence of noise due to dark current is observed and picture composition or depth of focus can be confirmed while viewing the image on the backside liquid crystal monitor 23 or partially enlarging the image. After displaying warning, the message of warning on the backside liquid crystal monitor 23 lets the photographer to understand a left time in which displaying of through-image is possible, which increases convenience.

(3) At the time when the release button is halfway-pressed, that is, when a preparatory operation for image pickup by the imaging device 21 is instructed, no realtime-image is displayed. When the condition that the temperature t in the periphery of the imaging device 21 is equal to or higher than a second lower threshold (tc−Δt) which is lower than the above-mentioned first threshold tc is satisfied, a warning is displayed and then the displaying of a realtime-image is prohibited even when a full-press operation is performed. Therefore, it can be avoided that the displaying of the realtime-image is stopped immediately after the displaying of a realtime-image is started, thus preventing the photographer from misunderstanding that a failure could have occurred to the electronic camera 1.

Various changes and modifications may be made to the electronic camera according to the above-mentioned embodiment, for example, as explained below.

(1) The frame rate of displaying a through-image or a moving-image may be decreased after a warning is displayed on the backside liquid crystal monitor 23. The operation in this case is shown in the flowchart shown in FIG. 5. As shown in FIG. 5, when a negative judgment is made in the step S23 to which the control precedes in the same manner as that in the above-mentioned embodiment, the control proceeds to a step S30. In the step S30, the frame rate of the through-image is changed to be set, for example, from 15 fps to 10 fps and the control returns to the step S13.

(2) While in the above-mentioned embodiment, it has been explained that the warning is displayed when the temperature t detected by the temperature sensor 108 reaches a value that is equal to or higher than the first threshold tc and when a predetermined time elapses after displaying the warning, the rear shutter screen is run to stop the introduction of light from the photographic subject into the imaging device, thus stopping the displaying of the through-image or moving-image. However, instead of the above, the rear shutter screen may be run immediately after the temperature t becomes equal to or higher than the first threshold tc to stop the displaying of the through-image or moving-image. In this case, after a warning of, for example, "DISPLAYING WILL BE STOPPED BECAUSE OF HIGH TEMPERATURE." is displayed only for a short period of time in which the photographer can confirm the message, the displaying of the through-image or moving-image is stopped without displaying a left time.

(3) In the above-mentioned embodiment, it has been explained that a left time until end of the displaying of the through-image or moving-image after the temperature t detected by the temperature sensor 108 becomes equal to or higher than the first threshold tc is displayed on the backside liquid crystal monitor 23 as the warning. However, the warning may be of the type in which from the beginning a time in which the through-image or moving-image can be displayed as a warning based on the temperature t detected at the time when the operation is started. In this case, the photographer can understand from the beginning a time in which displaying of the through-image or moving-image is possible, which increases convenience.

(4) While it has been explained that the temperature sensor 108 is implemented on the imaging circuit board 22 arranged in the rearward of the imaging device 21, the temperature sensor 108 may be attached to the imaging device 21 directly or to the image processing control circuit 105 as far as the temperature of the imaging device 21 can be measured. Alternatively, the temperature sensor 108 may be provided to the camera separately from the imaging device 21 or the image processing control circuit 105.

(5) While in the above-mentioned embodiment, it has been explained that the temperature sensor 108 measures the temperature of the inside of the electronic camera 1, a temperature sensor that measures the temperature of external air outside the electronic camera 1 may be provided so that the time in which displaying of the through-image or moving-image is possible can be varied. In this case, when the temperature of external air is lower than the temperature inside the electronic camera 1, the time in which displaying of the through-image or moving-image is possible may be set longer than otherwise. On the other hand, when the temperature of external air is higher than the temperature inside the electronic camera 1, the time in which displaying of the through-image or moving-image is possible may be set shorter than otherwise.

(6) In (5) above, instead of providing a temperature sensor that measures the temperature of external air, estimation of the temperature of external air may be made based on regional information obtained by using a global positioning system (GPS) In this case, it is more preferable that information on month, day and time be used in combination.

(7) While it has been explained that the temperature in the periphery of the imaging device 21 is detected by the temperature sensor 108, any method or system may be used as far as it can detect a physical quantity correlative with the temperature that causes dark current.

(8) Displaying of screen images constituted by overlapped noises, which are unpleasant to the eye, may be suppressed by stopping the displaying operation of the backside liquid crystal monitor 23. In addition, the operation of the imaging device 21 or the image processing control circuit 105 may be stopped.

(9) While in the above-mentioned embodiment, it has been explained that notification of warning is displayed on the backside liquid crystal monitor 23, the warning may be voice warning from a speaker provided with the camera 1.

(10) While it has been explained that the camera 1 is an electronic camera of which the lens barrel 4 is exchangeable, it may be an electronic camera with integrated lenses. In this case, when a power is switched on, a through-image is displayed on the screen of the backside liquid crystal display without the release button being operated. Where for a long period of time, the displaying of a through-image is continued and the temperature in the periphery of the imaging device increases to such an extent that dark current noises overlapped on the image signal, the displaying of the through-image is stopped when the detected temperature is equal to or higher than the first threshold as in the above-mentioned embodiments.

Since the camera of the present invention is adapted such that the through-image is displayed when the power switch is on, it is unnecessary to set a second threshold for a lens-integrated electronic camera. In the case where a moving image mode is set, the displaying of the moving-image will be stopped if the temperature in the periphery of the imaging device increases to such an extent that dark current noises overlapped on a moving image similarly to the case while a through-image is being displayed.

While specific embodiments of the invention have been shown and described in detail to illustrate the application of the inventive principles, it will be understood that the invention may be embodied otherwise without departing from such principles.

What is claimed is:

1. A camera comprising:
   an instructing unit that instructs initiation of imaging by an imaging device;
   a display unit that displays a realtime-image taken by the imaging device in response to the initiation of the imaging by the imaging device;
   a detecting unit that detects a physical quantity correlative with a temperature in the periphery of the imaging device;
   a warning unit that notifies a warning that displaying of the realtime-image is about to be stopped when the physical quantity satisfies a first predetermined condition, the warning being displayed on the display unit; and
   a stopping unit that stops displaying of the realtime-image by the display unit after lapse of a predetermined period of time from a time when the physical quantity satisfies the first predetermined condition while the realtime-image is being displayed, wherein
   the instruction unit instructs displaying of the realtime-image by the display unit in response to full-press operation of a release button,
   the stopping unit prohibits a start of the displaying of the realtime-image by the display unit upon full-pressing of the release button when the physical quantity detected by the detecting unit satisfies a second predetermined condition after the release button is halfway-pressed when no realtime-image is being displayed,
   the warning unit notifies a warning that no realtime-image is about to be displayed on the display unit even if the release button is full-pressed, when the physical quantity detected by the detecting unit satisfies the second predetermined condition after the release button is halfway-pressed, and
   the detecting unit is a temperature sensor that detects a temperature in the periphery of the imaging device, and the first predetermined condition is a condition under which the temperature is equal to or higher than a first threshold, and the second predetermined condition is a condition under which the temperature is equal to or higher than a second threshold, which is a temperature lower than the first threshold.

2. The camera according to claim 1, further comprising:
   a shutter that controls a quantity of incident light from a photographic subject into the imaging device, wherein
   the stopping unit stops introduction of the incident light from the photographic subject into the imaging device by the shutter and stops the displaying of the realtime-image.

3. The camera according to claim 1, wherein the stopping unit switches off a screen of the display unit to stop the displaying of the realtime-image.

4. The camera according to claim 1, wherein
   the warning unit displays the warning indicating the predetermined period of time.

5. A camera comprising:
   an instructing unit that instructs initiation of imaging by an imaging device;
   a display unit that displays a realtime-image taken by the imaging device in response to the initiation of the imaging by the imaging device;
   a detecting unit that detects a physical quantity correlative with a temperature in the periphery of the imaging device;
   a warning unit that notifies a warning that displaying of the realtime-image is about to be stopped when the physical quantity satisfies a first predetermined condition, the warning being displayed on the display unit; and
   a stopping unit that stops displaying of the realtime-image by the display unit after lapse of a predetermined period of time from a time when the physical quantity satisfies the first predetermined condition while the realtime-image is being displayed, wherein
   the instruction unit instructs displaying of the realtime-image by the display unit in response to an operation of the instruction unit,
   the stopping unit prohibits a start of the displaying of the realtime-image by the display unit upon the operation of the instruction unit when the physical quantity detected by the detecting unit satisfies a second predetermined condition after the instruction unit is operated when no realtime-image is being displayed,
   the warning unit notifies a warning that no realtime-image is about to be displayed on the display unit even if the instruction unit is operated, when the physical quantity detected by the detecting unit satisfies the second predetermined condition after the operation of the instruction unit, and
   the detecting unit is a temperature sensor that detects a temperature in the periphery of the imaging device, and the first predetermined condition is a condition under which the temperature is equal to or higher than a first threshold, and the second predetermined condition is a condition under which the temperature is equal to or higher than a second threshold, which is a temperature lower than the first threshold.

6. A camera according to claim 5, further comprising:
   a shutter that controls a quantity of incident light from a photographic subject into the imaging device, wherein
   the stopping unit stops introduction of the incident light from the photographic subject into the imaging device by the shutter and stops the displaying of the realtime-image.

7. A camera according to claim 5, wherein
   the stopping unit switches off a screen of the display unit to stop the displaying of the realtime-image.

8. A camera according to claim 5, wherein
   the warning unit displays the warning indicating the predetermined period of time.

* * * * *